(12) United States Patent
Penain et al.

(10) Patent No.: US 6,831,950 B2
(45) Date of Patent: Dec. 14, 2004

(54) ENCODING OF TWO CORRELATED SEQUENCES OF DATA

(75) Inventors: Stephane Penain, Villecresnes (FR); Gilles Goutelle, Perigny sur Yerres (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 697 days.

(21) Appl. No.: 09/822,443

(22) Filed: Mar. 30, 2001

(65) Prior Publication Data

US 2003/0190079 A1 Oct. 9, 2003

(30) Foreign Application Priority Data

Mar. 31, 2000 (EP) .............................................. 00400902

(51) Int. Cl.[7] .............................................. H04N 7/12
(52) U.S. Cl. ................ 375/240.12; 382/238; 348/409.1
(58) Field of Search ....................... 375/240.12, 240.04, 375/240.24, 240.16, 240.03, 240.15; 382/239, 238, 236; 348/409.1, 412.1, 420.1, 416.1

(56) References Cited

U.S. PATENT DOCUMENTS

| | | | | |
|---|---|---|---|---|
| 5,602,593 A | * | 2/1997 | Katto | 375/240.16 |
| 5,748,248 A | * | 5/1998 | Parke | 375/240.15 |
| 5,778,099 A | * | 7/1998 | Suzuki | 382/239 |
| 5,982,439 A | * | 11/1999 | Parke | 375/240.16 |
| 6,466,620 B1 | * | 10/2002 | Lee | 375/240.03 |

FOREIGN PATENT DOCUMENTS

| | | | | |
|---|---|---|---|---|
| EP | 06390381 | | 2/1995 | H04N/7/24 |

* cited by examiner

*Primary Examiner*—Gims Philippe

(57) ABSTRACT

A first sequence [SQ1] of data blocks [DB1-*] and a second sequence [SQ2] of data blocks [DB2-*] are encoded. The second sequence [SQ2] of data blocks [DB2-*] is correlated with the first sequence [SQ1] of data blocks [DB1-*]. This may concern, for example, an encoding of stereoscopic (3D) video. The first sequence [SQ1] of data blocks [DB1-*] is encoded in such a manner that certain data blocks serve as a reference [REF] for predictively encoding [PE] the other data blocks in the first sequence [SQ1]. The second sequence [SQ2] of data blocks [DB2-*] is encoded in such a manner that all data blocks [DB2-*] are predictively encoded [PE] with respect to those data blocks [DB1-*] in the first sequence [SQ1] which serve as a reference [REF]. For example, in a stereoscopic (3D) video encoding application, left-eye video frames are MPEG-encoded as if they belonged to an ordinary, non-stereoscopic video signal and right-eye video frames are all B-encoded with respect to I and P-encoded left-eye video frames, or vice versa. At the decoding end a relatively small memory will be sufficient for the purpose of decoding.

4 Claims, 3 Drawing Sheets

ENCODING OF TWO CORRELATED SEQUENCES OF DATA

FIELD OF THE INVENTION

The invention relates to a method of encoding a first sequence of data blocks and a second sequence of data blocks that is correlated with the first sequence of data blocks. The invention may be applied, for example, to encode stereoscopic (3D) video.

BACKGROUND OF THE INVENTION

It is possible to encode a sequence of data blocks in such a manner that certain data blocks serve as a reference for predictive encoding of the other data blocks. This technique is applied, for example, for coding video frames in accordance with a standard of the Moving Picture Expert Group (MPEG).

There are applications in which two correlated sequences of data blocks need to be coded. The coding of stereoscopic video is an example. Stereoscopic (3D) video will generally comprise a sequence of left-eye video frames and a sequence of right-eye video frames. The sequence of left-eye video frames and the sequence of right-eye video frames can be seen as a first and a second sequence of data blocks, respectively. The sequences are correlated.

Stereoscopic video can be encoded in the following manner. The sequence of left-eye video frames is encoded in accordance with an MPEG video coding technique as if this sequence were an ordinary video signal. This implies that certain left-eye video frames will serve as a reference for predictive coding of the other left-eye video frames. As for the sequence of right-eye video frames, each right-eye video frame is predictively encoded with respect to the corresponding left-eye video frame. This means that each left-eye video frame forms a reference for predictive encoding of the corresponding right-eye video frame. This manner of encoding stereoscopic video seems to be disclosed in the European patent application published under number 0 639 031.

SUMMARY OF THE INVENTION

It is an object of the invention to allow a cost reduction to be achieved.

The invention takes the following aspects into consideration. In order to decode a data block that has been predictively encoded, it is necessary that each data block that has served as a reference for this predictive encoding is available. Consequently, at a decoding end, it will be necessary to temporarily store data blocks that have served as a reference for the predictive encoding of other data blocks.

In accordance with the prior art, each right-eye video frame is predictively encoded with respect to the corresponding left-eye video frame. This implies that each left-eye video frame needs to be temporarily stored at the decoding end. This storage requires a relatively large memory, in particular because video frames generally comprise relatively many bits.

In accordance with the invention, a first sequence of data blocks is encoded in such a manner that certain data blocks serve as a reference for predictive encoding of the other data blocks. A second sequence of data blocks, which is correlated with the first sequence of data blocks, is encoded in such a manner that all data blocks are predictively coded with respect to the data blocks in the first sequence that serve as a reference.

Accordingly, at the decoding end, it will not be necessary to store all data blocks comprised in the first sequence whereas, in contrast, this is necessary in the prior art. It is sufficient to store those data blocks in the first sequence that served as a reference. Consequently, a decoder in accordance with the invention will require less storage capacity than a decoder in accordance with the prior art. Consequently, the invention allows a cost reduction to be achieved.

Another advantage of the invention relates to the following aspects. Predictive encoding inherently entails some inaccuracies: a prediction is rarely 100% correct. These inaccuracies will generally have an adverse effect on the quality of the data that will be obtained at a decoding end. In accordance with the prior art, some data blocks in the second sequence are predictively encoded with respect to data blocks in the first sequence that are themselves results of predictive encoding. This means that, in accordance with the prior art, the encoding of some data blocks involves two predictive encoding operations in series. Consequently, inaccuracies will accumulate. Since, in accordance with the invention, all data blocks in the second sequence are predictively coded with respect to the data blocks in the first sequence that serve as a reference, such an accumulation of inaccuracies cannot occur. Consequently, the invention enables a better quality to be obtained.

These and other aspects of the invention will be described in greater detail hereinafter with reference to the drawings.

EMBODIMENTS OF THE INVENTION

The following remarks relate to reference signs. Like entities are designated by like letter references in all the Figures. Several similar entities may appear in a single Figure. In that case, a digit or a suffix is added to the letter reference in order to distinguish between like entities. The digit or the suffix may be omitted for convenience or it may be replaced by an asterisk in the case that its value is not important (do not care value). This applies to the description as well as the claims.

Figure 1:
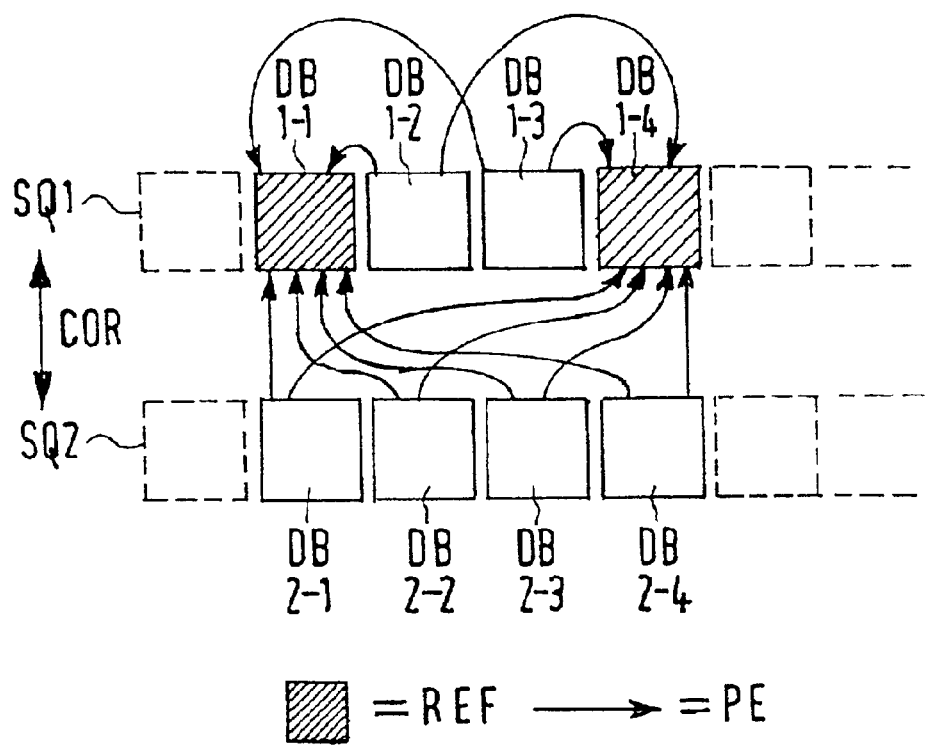
FIG. 1 is a conceptual diagram illustrating basic features of the invention described hereinbefore.

FIG. 1 illustrates basic features of the invention described hereinbefore. There is a first sequence [SQ1] of data blocks [DB1-*] and a second sequence [SQ2] of data blocks [DB2-*]. The second sequence [SQ2] of data blocks [DB2-*] is correlated with the first sequence [SQ1] of data blocks [DB1-*]. The first sequence [SQ1] of data blocks [DB1-*] is encoded in such a manner that certain data blocks serve as a reference [REF] for the predictive encoding [PE] of the other data blocks in the first sequence [SQ1]. The second sequence [SQ2] of data blocks [DB2-*] is encoded in such a manner that data blocks [DB2-*] are predictively encoded [PE] with respect to those data blocks [DB1-*] in the first sequence [SQ1] which serve as a reference [REF].

The features illustrated in FIG. 1 may be applied, for example, to encode stereoscopic (3D) video. In that case, the data blocks illustrated in FIG. 1 may, for example, correspond to video frames. The predictive encoding may be based on motion estimation and compensation techniques currently applied for MPEG video coding of non-stereoscopic video.

Figure 2:
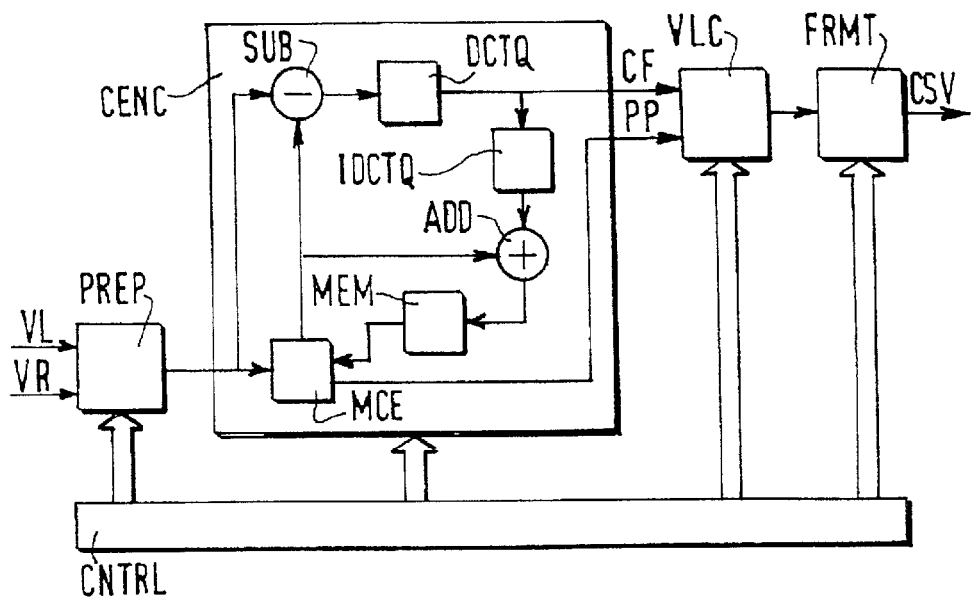
FIG. 2 is a block diagram of an encoder for stereoscopic video in accordance with the invention.

FIG. 2 shows an encoder for stereoscopic video in accordance with the invention. The encoder receives a sequence [VL] of left-eye video frames and a sequence [VR] of right-eye video frames and provides, in response, coded stereoscopic video data [CSV]. The encoder comprises a pre-processor [PREP], a core encoder [CENC], a variable-length encoder [VLC], a formatter [FRMT] and a controller [CNTRL]. More specifically, the core encoder [CENC] comprises a motion estimator and compensator [MCE], a subtractor [SUB], a discrete cosine transformer and quantizer [DCTQ], an inverse discrete cosine transformer and quantizer [IDCTQ], an adder [ADD] and a memory [MEM].

The encoder illustrated in FIG. 2 basically operates as follows. The preprocessor [PREP] modifies the order of the left-eye video frames in accordance with an MPEG standard. This means that the order of the left-eye video frames is modified as if these video frames belonged to a non-stereoscopic video signal. The pre-processor [PREP] combines the left-eye video frames, in the re-arranged order, with the right-eye video frames. Accordingly, the pre-processor applies a multiplex of left-eye and right-eye video frames to the core-encoder [CENC].

The core-encoder [CENC] encodes the left-eye video frames in accordance with an MPEG standard as if these video frames belonged to a non-stereoscopic video signal. Consequently, the left-eye video frames will either undergo an I, P or B encoding depending on their respective positions in the sequence and the type of MPEG coding that is applied. In contrast, all right-eye video frames undergo a B encoding, which is a predictive encoding. More specifically, each right-eye video frame is predictively encoded with respect to a left-eye video frame that has undergone either an I encoding or a P encoding but not with respect to a left-eye video frame that has undergone a B encoding. This means that, the core encoder [CENC] encodes each right-eye video frame as if the video frame were a left-eye video frame destined to undergo a B encoding. The core encoder [CENC] provides quantized coefficients [CF] for each video frame, left-eye or right-eye, it encodes. It also provides predictive encoding parameters [PP] if the video frame has been predictively encoded.

The variable-length encoder [VLC] translates the quantized coefficients [CF] and the predictive encoding parameters [PP] into variable-length code words. The formatter [FRMT] combines the code words of different origin and any other data that will be required at a decoding end, such as identifiers. The formatter [FRMT] casts all this data into an appropriate format. Accordingly, the formatter [FRMT] provides the encoded stereoscopic video data [CSV]. It goes without saying that the controller [CNTRL] is suitably programmed so as to supply control signals to the various entities in the encoder and cause these entities to function as described hereinbefore.

Figure 3:
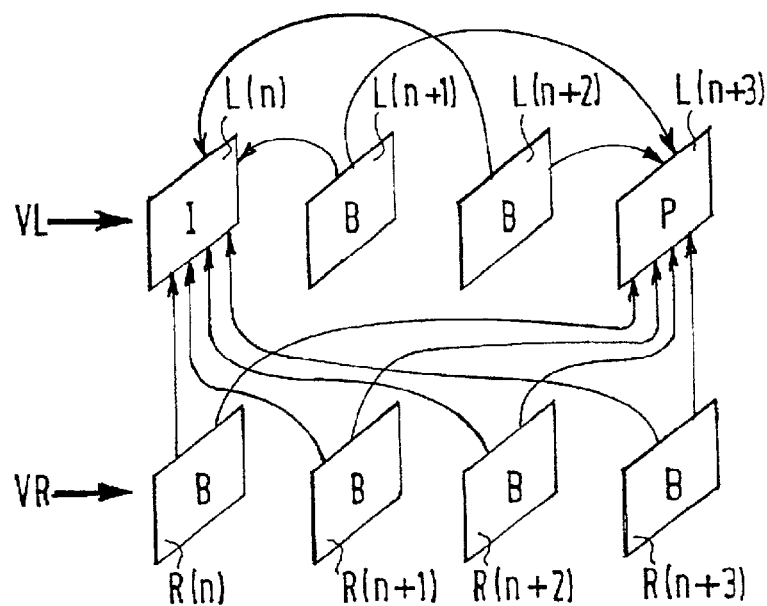
FIG. 3 is a diagram illustrating a method of encoding left-eye and right-eye video frames in accordance with the invention.

FIG. 3 illustrates the encoding of left-eye and right-eye video frames. A rectangle represents a video frame to be encoded. Four left-eye video frames [L] and four right-eye video frames [R] are shown. The suffix in the reference sign of a video frame indicates the position of the video frame in the sequence [VL,VR] received by the encoder shown in FIG. 2. The letter I, P or B inside a rectangle denotes the encoding which the relevant video frame will undergo.

In FIG. 3 the predictive encoding is illustrated by means of arrows. A video frame from which an arrow emanates is an video frame that will be predictively encoded. The video frame at which the arrow terminates is a video frame that serves as a reference for this predictive encoding. For example, left-eye video frames L(n+1) and L(n+2) will be predictively encoded with respect to left-eye video frames L(n) and L(n+3). All right-eye video frames [R] will also be predictively encoded with respect to left-eye video frames L(n) and L(n+3). The pre-processor [PREP] may apply the left-eye and right-eye video frames to the core encoder [CENC] in the following order: L(n), L(n+3), R(n), L(n+1), R(n+1), L(n+2), R(n+2), R(n+3).

Figure 4:
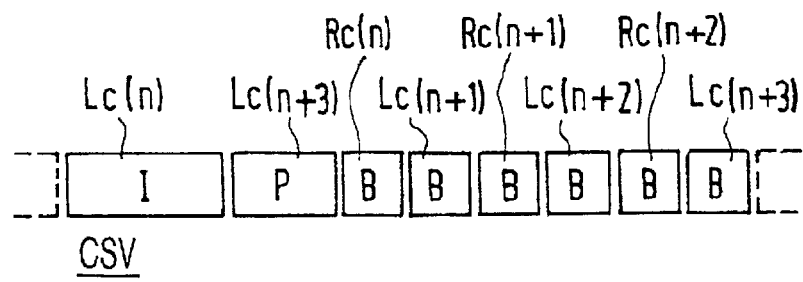
FIG. 4 is a diagram representing encoded stereoscopic video data supplied by the encoder illustrated in FIG. 2 provides.

FIG. 4 represents the encoded stereoscopic video data [CSV] that the encoder illustrated in FIG. 2 supplies. The encoded stereoscopic video data [CSV] comprises encoded left-eye and right-eye video frames [Lc, Rc] represented as rectangles. The encoded left-eye and right-eye video frames [Lc, Rc] result from the encoding of the left-eye and right-eye video frames [L, R] shown in FIG. 3. The suffix in the reference sign of an encoded left-eye or right-eye video frame [Lc, Rc] indicates the left-eye or right-eye video frame [L, R], respectively, which has been encoded. The letter I, P or B inside a rectangle denotes the encoding which has been applied. For example, the encoded left-eye video frame Lc(n+1) is the B-encoded version of the left-eye video frame L(n+1) shown in FIG. 3.

Figure 5:
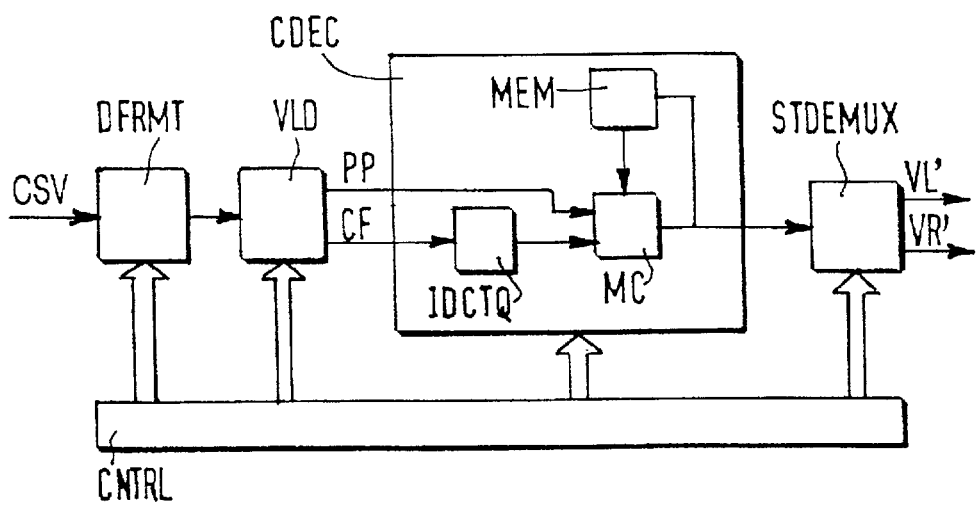
FIG. 5 is a block diagram of a decoder for stereoscopic video in accordance with the invention.

FIG. 5 shows a decoder for stereoscopic video in accordance with the invention. The decoder receives the encoded stereoscopic video data [CSV] illustrated in FIG. 4 via a transmission channel that is not shown. In response, it supplies a sequence [VL'] of decoded left-eye video frames and a sequence [VR'] of decoded right-eye video frames. The decoder comprises a de-formatter [DFRMT], a variable-length decoder [VLD], a core decoder [CDEC], a stereoscopic video demultiplexer [STDEMUX] and a controller [CNTRL]. More specifically, the core decoder [CDEC] comprises an inverse discrete cosine transformer and quantizer [IDCTQ,] a motion compensator [MC] and a memory [MEM]. The decoder shown in FIG. 5 basically operates as follows. The de-formatter [DFRMT] separates the data that should be variable-length decoded from the data that should not be variable-length decoded. The latter data is applied to the controller [CNTRL]. The data may include, for example, identifiers, which can be used by the stereoscopic video demultiplexer [STDEMUX] in order to distinguish between left-eye video frames and right-eye video frames. The variable-length decoder [VLD] translates code words back into the quantized coefficients [CF] and the predictive encoding parameters [PP] that have been determined in the encoder illustrated in FIG. 2.

The core decoder [CDEC] regenerates left-eye and right-eye video frames on the basis of the quantized coefficients [CF] and the predictive encoding parameters [PP]. More specifically, the core-decoder [CDEC] regenerates the left-eye video frames as if they originated from standard non-stereoscopic MPEG-coded video data. The core decoder [CDEC] regenerates the right-eye video frames as if they were B-encoded left-eye video frames. Referring to FIG. 3, it is sufficient that the memory [MEM] temporarily stores the encoded video frame L(n) and the P-encoded video frame L(n+3) in order to decode all the video frames shown in FIG. 3.

The stereoscopic video demultiplexer [STDEMUX] re-arranges the order of the left-eye video frames supplied by the core decoder [CDEC]. It further de-multiplexes the left-eye video frames and the right-eye video frames. For example, referring to FIG. 3, the core decoder [CDEC] will successively supply decoded versions of the video frames L(n), L(n+3), R(n), L(n+1), R(n+1), L(n+2), R(n+2), R(n+3). After a certain delay, the stereoscopic video demultiplexer [STDEMUX] will then successively supply the decoded versions of the left-eye video frames [L] and, in parallel, the decoded versions of the right-eye video frames [R]. Accordingly, the decoded sequence [VL'] of left-eye video frames and the decoded sequence [VR'] of right-eye video frames are obtained. It goes without saying that the controller [CNTRL] is suitably programmed so as to supply control signals to the various entities in the decoder and cause these entities to function as described hereinbefore.

The drawings and their description hereinbefore illustrate rather than limit the invention. It will be evident that there are numerous alternatives which fall within the scope of the appended claims. In this respect, the following closing remarks are made.

There are various manners to format encoded stereoscopic video. FIG. 4 illustrates only one possible format, in which the order of the encoded frames is Lc(n/I), Lc(n+3/P), Rc(n/B), Lc(n+1/B), Rc(n+1/B), Lc(n+2/B), Rc(n+2/B), Rc(n+3/B). Another possible format is, for example, Lc(n/I), Lc(n+3/P), Lc(n+1/B), Lc(n+2/B), Rc(n/B), Rc(n+1/B), Rc(n+2/B), Rc(n+3/B). Many different formats are possible, just like many different formats exist for standard MPEG encoding.

There are various manners to transfer encoded stereoscopic video from an encoder to a decoder. For example, the encoder illustrated in FIG. 2 may be coupled to the decoder illustrated in FIG. 5 via a transmission channel that carries the encoded stereoscopic video data [CSV]. Another possible implementation is, for example, that the encoder is part of a recording device, which implies that the encoded stereoscopic video data [CSV] is recorded on a carrier. The decoder may be part of the same recording device or another device that retrieves the encoded stereoscopic data [CSV] from the carrier.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that a combination of items of hardware and/or software carries out a function.

Any reference sign in a claim should not be construed as limiting the claim. The verb "to comprise" does not exclude the use of any other elements or steps than those defined in a claim. The indefinite article "a" or "an" preceding an element or step does not exclude the use of a plurality of such elements or steps.

What is claimed is:

1. A method of encoding a first sequence [SQ1] of data blocks [DB1-*] and a second sequence [SQ2] of data blocks [DB2-*] that is correlated with the first sequence [SQ1] of data blocks [DB1-*], the method comprising the step of encoding the first sequence [SQ1] of data blocks [DB1-*] in such a manner that certain data blocks serve as a reference [REF] for predictively encoding [PE] the other data blocks in the first sequence [SQ1], characterized in that the method comprises the step of encoding the second sequence [SQ2] of data blocks [DB2-*] in such a manner that all data blocks [DB2-*] are predictively encoded [PE] with respect to those data blocks in the first sequence [SQ1] which serve as a reference [REF].

2. An encoder for encoding a first sequence [VL] of data blocks [L] and a second sequence [VR] of data blocks [R] that is correlated with the first sequence [VL] of data blocks [L], the encoder comprising means to encode the first sequence [VL] of data blocks [L] in such a manner that certain data blocks serve as a reference for predictively encoding the other data blocks [L(n+1), L(n+2)] in the first sequence [VL], characterized in that the encoder comprises means to encode the second sequence [VR] of data blocks [R] in such a manner that all data blocks [R] are predictively encoded with respect to those data blocks in the first sequence [VL] which serve as a reference [L(n), L(n+3)].

3. A decoder for decoding a multiplex [CSV] of an encoded first sequence [VL] of data blocks [L] and an encoded second sequence [VR] of data blocks [R], the second sequence [VR] of data blocks [R] being correlated with the first sequence [VL] of data blocks [L], the decoder comprising means to decode the first sequence [VL] of data blocks [L] in such a manner that certain data blocks [L(n), L(n+3)] serve as a reference for predictively decoding the other data blocks [L(n+1), L(n+2)] in the first sequence [VL], characterized in that the decoder comprises means to decode the second sequence [VR] of data blocks [R] in such a manner that all data blocks [R] are predictively decoded with respect to those data blocks in the first sequence [VL] which serve as a reference [L(n), L(n+3)].

4. A multiplex [CSV] of an encoded first sequence [VL] of data blocks [L] and an encoded second sequence [VR] of data blocks [R], the second sequence [VR] of data blocks [R] being correlated with the first sequence [VL] of data blocks [L], the first sequence [VL] of data blocks [L] having been encoded in such a manner that certain data blocks [L(n), L(n+3)] serve as a reference for predictively decoding the other data blocks [L(n+1), L(n+2)] in the first sequence [VL], characterized in that the second sequence [VR] of data blocks [R] has been encoded in such manner that all data blocks [R] are predictively encoded with respect to those data blocks in the first sequence [VL] which serve as a reference [L(n), L(n+3)].

* * * * *